United States Patent

Sirat et al.

Patent Number: 5,379,352
Date of Patent: Jan. 3, 1995

[54] METHOD OF PROCESSING SIGNAL DATA ON THE BASIS OF PRINCIPAL COMPONENT TRANSFORM, APPARATUS FOR PERFORMING THE METHOD

[75] Inventors: Jacques A. Sirat, Versailles; Didier E. Zwierski, Saint-Maur-Des-Fosses, both of France

[73] Assignee: U.S. Philips Corporation, New York, N.Y.

[21] Appl. No.: 66,406

[22] Filed: May 24, 1993

Related U.S. Application Data

[63] Continuation of Ser. No. 677,703, Mar. 29, 1991, abandoned.

[30] Foreign Application Priority Data

Mar. 30, 1990 [EP] European Pat. Off. ............ 90400875

[51] Int. Cl.$^6$ ............................................. G06K 9/36
[52] U.S. Cl. .................................................... 382/41
[58] Field of Search .................. 382/41, 54, 56; 358/133, 426, 438; 364/715.02, 715.03, 725

[56] References Cited

U.S. PATENT DOCUMENTS 4,945,502 7/1990 Kwon et al. ..................... 382/51

OTHER PUBLICATIONS

R. C. Gonzales et al., Digital Image Processing, Second Edition, Addison–Wesley Publishing Company, 1987, pp. 122–130.
Y. Chauvin, "Principal Component Analysis By Gradient Descent On a Constrain Linear Hebbian Cell", IEEE and INNS International Joint Conference on Neural Nets, 1989, pp. I373–I405.

Primary Examiner—Joseph Mancuso
Assistant Examiner—David Fox
Attorney, Agent, or Firm—Anne E. Barschall

[57] ABSTRACT

Method of processing signal data on the basis of Principal Component Transform, apparatus for performing the method. A method is proposed for determining approximations of eigenvectors of a covariance matrix associated with signal data on the basis of the Principal Component Transform. Successive iterations on estimates enhance the development into the direction of the principal component considered. The method is applicable to the Singular Value Decomposition of data matrices. The operations to be performed are similar to those required in a neural net for adapting the synaptic coefficients. Apparatus are proposed for performing the method.

10 Claims, 6 Drawing Sheets

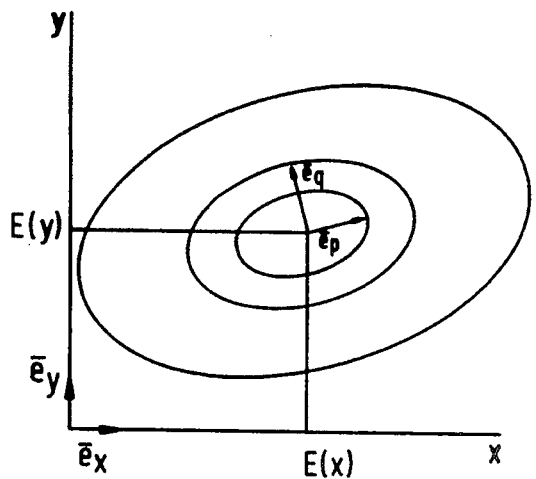
FIG.1
i) $p_N(\bar{x}) = \dfrac{1}{(2\pi)^{N/2}} \cdot \dfrac{1}{|C|^{1/2}} \cdot \exp[-\tfrac{1}{2}(\bar{x}-\bar{\mu}) \cdot C^{-1} \cdot (\bar{x}-\bar{\mu})]$
ii) $p_i(z) = \dfrac{1}{(2\pi)^{1/2}} \cdot \dfrac{1}{\sigma_i} \cdot \exp[-\tfrac{1}{2}\dfrac{z-\mu_i}{\sigma_i\,2}]$
FIG.2
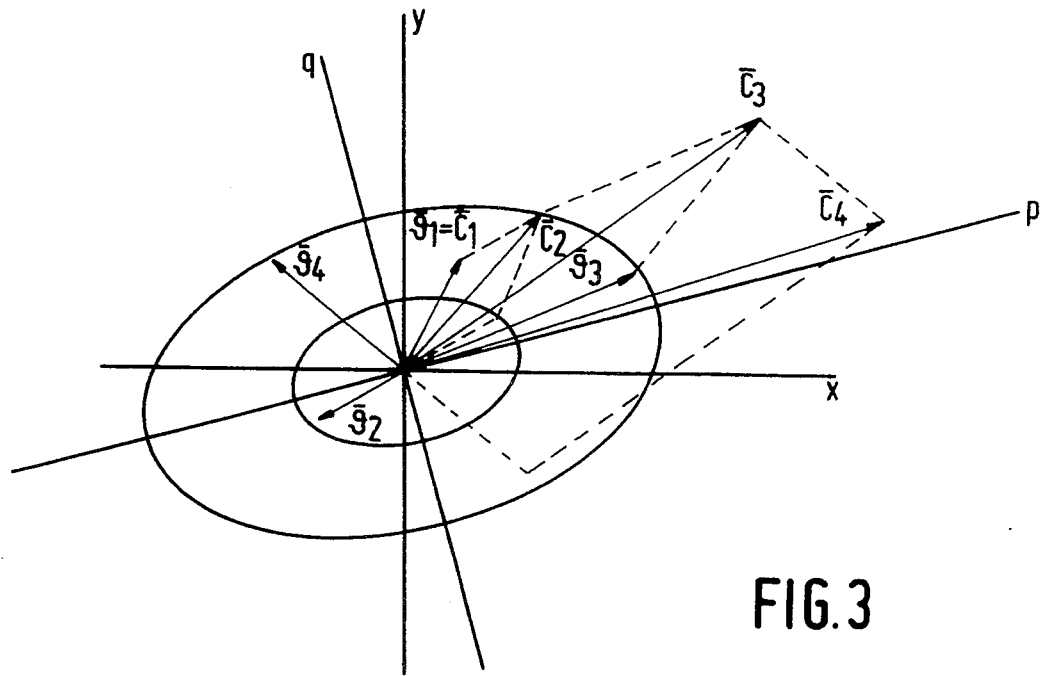
FIG.3

$$\bar{c}_1 = \bar{\vartheta}_1 ;$$
$$\bar{c}_{k+1} = \bar{c}_k + \text{sign}(\bar{c}_k \cdot \bar{\vartheta}_{k+1}) \bar{\vartheta}_{k+1}, \quad k \geq 1.$$
FIG. 4
$$s^2 = \frac{1}{p} \sum_{k=1}^{p} [(\bar{c} \cdot \bar{\vartheta}_k)]^2$$
FIG. 5
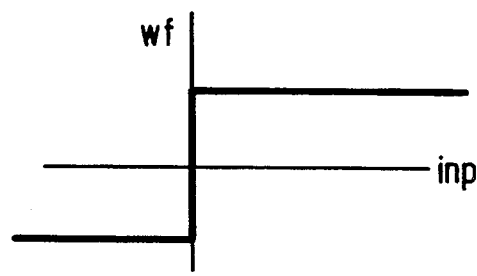
FIG. 6a
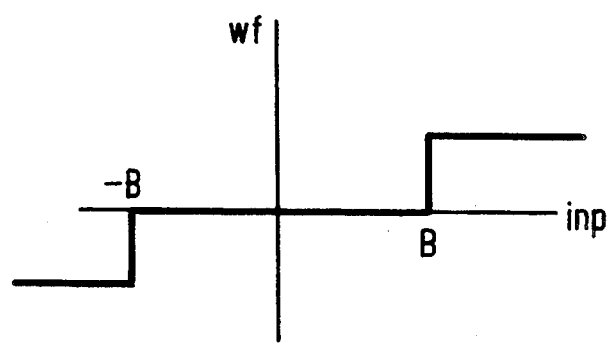
FIG. 6b (i)    $\bar{y}^k = A\bar{x}^k$ (ii)   $\bar{c}_1 = \bar{y}^1$ ; $\bar{b} = \bar{x}^1$ (iii)  $\bar{c}_{k+1} = \bar{c}_k + \text{sign}(\bar{c}_k \cdot \bar{y}^{k+1}) \bar{y}^{k+1}$ (iv)   $\bar{c}_{k+1} = A\bar{b}_{k+1}$ (v)    $\bar{b}_{k+1} = \bar{b}_k + \text{sign}(\bar{c}_k \cdot \bar{y}^{k+1}) x^{k+1}$ (i) $\quad \bar{y} = A\bar{x} \qquad ; x \in \mathbb{R}^n \quad ; y \in \mathbb{R}^m \quad ; A: m \times n$ (ii) $\quad <\bar{x}\,\bar{x}>_{ij} \;=\; <x_i\,x_j> \;=\; \delta_{ij}$ (iii) $\quad <\bar{y}\,\bar{y}>_{pq} \;=\; <y_p\,y_q> \;=\; <A_{ps}\,x_s \quad A_{qt}\,x_t> \;=$ $\qquad\qquad = A_{ps}\,A_{qt}\,<x_s\,x_t> \;=\; A_{ps}\,A_{qs}$ $\qquad\qquad = (A\,A^T)_{pq}$ (iv) $\quad V_1^T\,AA^T\,V_1 \;=\; \Sigma_1^2$ (v) $\quad U_1^T\,A^T A\,U_1 \;=\; \Sigma_1^2$ (vi) $\quad A \;=\; V_1 \Sigma_1 U_1^T$ (vii) $\quad V_1 \;=\; AU_1 \Sigma^{-1}$ FIG.9

(i) $\quad y_i \;=\; A_{ij}\,x_j$ (ii) $\quad A_{ij} \;=\; \hat{v}_{il}\,\sigma_l\,\delta_{lp}\,\hat{u}_{jp} \;=\; \hat{v}_{il}\,\sigma_l\,\hat{u}_{jl}$ (iii) $\quad y_i \;=\; \hat{v}_{il}\,\sigma_l\,\hat{u}_{jl}\,x_j \;=$ $\qquad\qquad = \hat{v}_{il}\,\sigma_l\,(\bar{x}\cdot\bar{u}_l)$ (iv) $\quad \sigma_l \;=\; \dfrac{(\bar{y}\cdot\bar{v}_l)}{(\bar{x}\cdot\bar{u}_l)}$ FIG.11

METHOD OF PROCESSING SIGNAL DATA ON THE BASIS OF PRINCIPAL COMPONENT TRANSFORM, APPARATUS FOR PERFORMING THE METHOD

This is a continuation of application Ser. No. 07/677,703, filed Mar. 29, 1991, abandoned.

The invention relates to a method of processing signal data on the basis of a Principal Component Transform, including a determination of an approximation of a statistically most significant eigenvector of a covariance matrix associated with said signal data represented in a vector space, and to an apparatus for executing the method.

1. Background of the Invention

Principal Component Analysis (PCA) is a strategy based on the statistical properties of a signal, that is, coherent data representing, for example, an image pattern or a speech pattern. In general, such data are mutually strongly correlated, which is expressed by way of a so-called covariance matrix. By definition, this covariance matrix is positive symmetric. This implies the existence of a set of mutually orthogonal eigenvectors (principal components). A representation of the covariance matrix on the base, determined by its eigenvectors, is a diagonal matrix, the on-diagonal components being the respective eigenvalues (variances) associated with the eigenvectors, the off-diagonal components being equal to zero. The mapping of the covariance matrix onto the base of its eigenvectors is commonly referred to as Principal Component Transform, Eigenvector Transform, Hotelling Transform or Karhunen-Loe e Transform (see for instance: Digital Image Processing, R. C. Gonzalez and P. Wintz, Second Edition, Addison-Wesley Publishing Company, 1987, pages 122-130).

The diagonal form expresses the fact that the accordingly transformed data now are uncorrelated, since the off-diagonal components are equal to zero. This transformation is applied especially in data compression, feature extraction and encoding. By decomposing the data into a set of uncorrelated components of decreasing statistical significance data compression is accomplished by selecting those components of greatest statistical significance and discarding the rest. Another application of this transform is for example the execution of image rotation in image processing (see pages 125-130 of the above cited book).

2. Prior Art

Principal Component Analysis is dealt with, for instance, by Y. Chauvin in "Principal Component Analysis by Gradient Descent on a constrained linear Hebbian Cell", IEEE and INNS International Joint Conference On Neural Nets, 1989, pages 1373-1405. In this prior an the behaviour of a linear computing unit is examined during learning by gradient descent of a cost function equal to the sum of a variance maximization term and a weight normalization term. This cost function has a global minimum aligned with the principal components of the patterns that are input into the linear computing unit. The learning trajectory will converge towards this global minimum provided some particular conditions are met. Also, one of the assumptions made for guaranteeing the validity is that the covariance matrix has distinct eigenvalues.

OBJECT OF THE INVENTION

The iterations performed during this gradient descent require substantial calculations. It is therefore an object of the invention to perform the Principal Component Analysis needing fewer and simpler calculations per iteration, while admitting degenerate eigenvalues.

SUMMARY OF THE INVENTION

To this end, a method according to the invention is characterized in that the determination comprises the steps of:
- taking an initial vector in said vector space as a first estimate;
- for each next estimate determining a linear combination of the preceding estimate and a next vector in said vector space, said next vector being weighted with a factor that depends on an inner product of the preceding estimate and said next vector for enhancing a next estimate's component into a direction of the preceding estimate,
- upon termination of determining next estimates taking said approximation parallel to the last obtained estimate.

By enhancing the next estimate's component in the direction of the preceding estimate, the estimates develop into the direction of the most significant eigenvector, that is, the eigenvector associated with the largest eigenvalue. For determining approximations of further eigenvectors, in principle the same steps as cited above may be traversed, but now using vectors in a subspace orthogonal to the approximations of the respective eigenvectors calculated previously. Per iteration an inner product calculation, a scalar vector multiplication and a vector addition are required. In case eigenvalue-degeneracy is met, the orthogonal-subspace-construction guarantees that the approximations of the associated eigenvectors are found. In general, the eigenvectors are approximated according to the invention in order of decreasing statistical significance, that is, in order of decreasing eigenvalue.

Preferably, for determining a further approximation of a further eigenvector of the covariance matrix, the method according to the invention includes the step of:
- taking as a first further estimate an initial further vector that lies in a region of the vector space that is determined by vectors that have an absolute inner product value with each previously determined respective approximation smaller than a predetermined respective value;
- for each next further estimate determining a linear combination of the preceding further estimate and a next further region vector, said next further region vector being weighted with a factor estimate and the next further vector, for enhancing the next further estimate into a direction of the preceding further estimate;
- upon termination of determining next further estimates orthogonalizing the last obtained further estimate with respect to each previously determined approximation;
- taking the further approximation parallel to said orthogonalized last obtained further estimate.

Instead of orthogonalizing each further vector with respect to the already obtained approximations, the orthogonalization now is executed only for the last obtained estimate, thereby saving substantial calculation time. An additional advantage is that the inner product values of the vectors and each of the previously determined and normalized approximations are required anyway for producing the associated eigenvalues, thus allowing for an efficient strategy.

Preferably the factor for weighting the next vector or the next further vector is the sign-function operating on the inner product, giving rise to only an inversion in case the sign function delivers a minus. For taking into account only vectors that contribute substantially to the determining of the next estimate or the next further estimate, preferably said factor is the sign-function operating on the inner product when the inner product has a value outside a predetermined interval around zero, and equals zero when the inner product has a value within the interval. This could also be accomplished by selecting vectors, that were discarded in a previous determination of an approximation because of their insufficient inner product values.

The associated eigenvalues are found by:
normalizing the last obtained estimate, associated with the particular eigenvector, onto unity,
determining a summation of squares of the inner products, each respective inner product involving the normalized estimate and the respective vector, used for producing a respective estimate, and averaging a summation result. It is particularly advantageous to implement the method on a (digital) neural-net-like structure, since the required operations (inner product, sealax-vector multiplication and vector addition) reflect the constituents of the majority of calculations for updating the synaptic coefficients.

These rules can be recapitulated as:

$$S_i = f(\sum C_{ij} V_j) \quad (a)$$

$$C_{ij}(\text{new}) = C_{ij}(\text{present}) + \Delta_i V_j \quad (b)$$

Equation (a) expresses the non-linear dependence of the output $S_i$ of neuron i on the vector inner product of the i-th row of the synaptic coefficient matrix C and the vector V, the components thereof consisting of the outputs of the neurons j that are coupled with the input of neuron i across synaptic coefficients $C_{ij}$. Equation (b) indicates the updating of each synaptic coefficient according to some learning rule of a general type, involving a neuron output $V_j$ and a correction factor $\Delta_i$. The steepest descent strategy, for example, complies with the general updating rule according to equation (b). When executed in parallel with respect to index i or index j or both equation (b) indicates a vector-addition.

APPLICATION TO THE SINGULAR VALUE DECOMPOSITION

The method according to the invention explained above can successfully be incorporated in signal data manipulations related to-the Singular Value Decomposition. The expression "Singular Value Decomposition" indicates a generalization of the eigenvector-eigenvalue representation for square data matrices as referred to hereinabove. According to Matrix Theory for each rectangular mxn matrix there exist transformation matrices that produce a generalized diagonal matrix having components on the generalized diagonal that represent the so-called singular values and having components off the generalized diagonal equal to zero. Within the field of signal processing Singular Value Decomposition (SVD) is applied in adaptive filtering, linear prediction estimation, modal analysis in dealing with multiple-sinusoidal signals, adaptive modelling, etcetera. Numerous technical applications are extensively examined in: "SVD and Signal Processing: Algorithms, Applications and Architectures", Edited by Ed. F. Deprettere, North-Holland, 1988.

For extracting information out of the signal data processing system under consideration, according to the SVD, it is assumed that it is well described with a linear model. That is, the system incorporates a linear transformation as the input-output relationship. The matrix that substantiates this linear transformation often is unknown. It is further assumed here that information relating to this matrix can be derived from measurements of particular input vectors and the associated output vectors of the system.

According to the invention one proceeds as follows. A collection of input vectors is established having a random and uniform distribution in the input space, that is, its input covariance matrix is a unity matrix. This implies that the output covariance matrix of the output vectors in the output space comprises only components related to the matrix sought for. Diagonalizing the output covariance matrix according to the method as described hereinbefore with reference to the Principal Component Analysis leads to a set of base vectors in the output space that defines a first transformation matrix. An associated second transformation matrix comprising the base vectors for the input space is determined in parallel therewith. These transformation matrices define the Singular Value Decomposition together with the set of generalized eigenvalues that can be deduced from both the base vectors and the measurements as will be described hereinafter.

BRIEF DESCRIPTION OF THE DRAWINGS

The invention will be described hereinafter by way of example and with reference to the accompanying diagrammatic drawing in which:

FIG. 1 visualizes an example of a Gaussian probability density function of two correlated stochastic variables;

FIG. 2 gives formulae related to the diagram of FIG. 1;

FIG. 3 visualizes the construction of the successive estimates for producing an eigenvector;

FIG. 4 gives the formulae related to the construction visualized in FIG. 3;

FIG. 5 gives the formula for determining the eigenvalues;

FIG. 6a and 6b show examples of weighting functions for determining the inner product-dependent factor;

FIG. 9 gives the formulae related to the Singular Value Decomposition (SVD) in general;

FIG. 11 gives the formula for determining approximated singular values;

GAUSSIAN PROBABILITY DENSITY

Figures 7, 10:
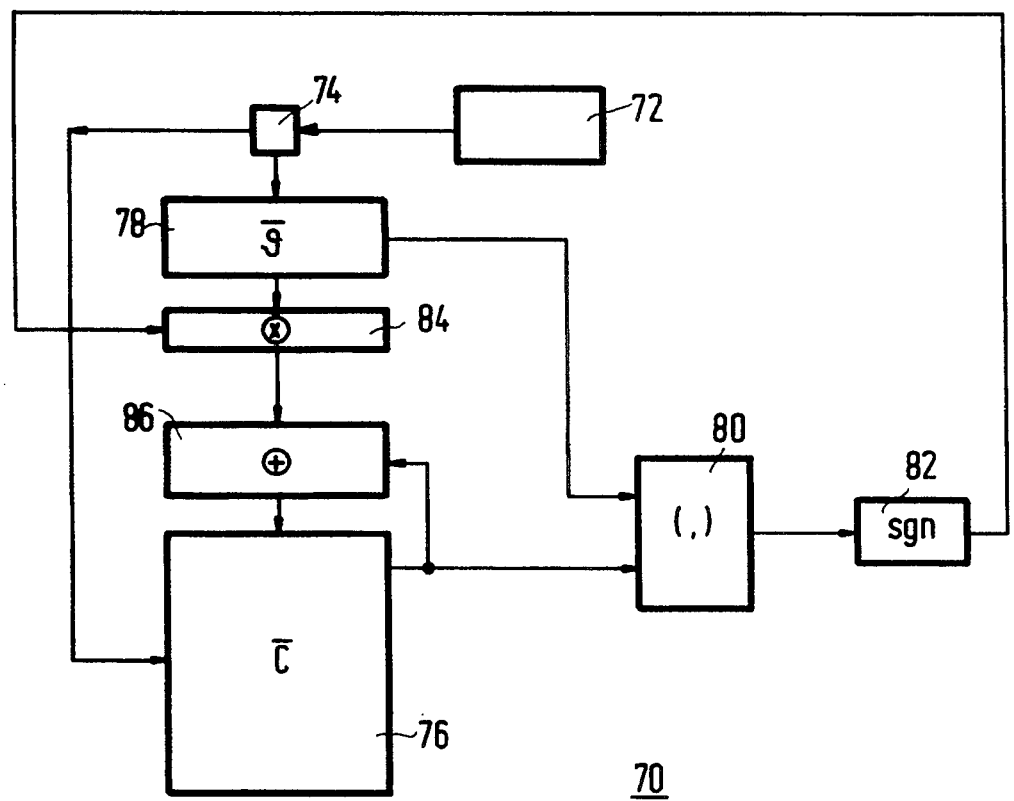
FIG. 7 shows a first example of an embodiment of an apparatus according to the invention.
FIG. 10 gives the formulae for determining successive estimates for the eigenvectors playing a part in the SVD.

FIG. 1 shows an example of a Gaussian probability density function of stochastic variables x and y, that have expected or mean values E(x) and E(y), respectively. The closed contours represent curves of constant probability density. The probability of the variables x and y taking values belonging to a particular region in the x-y plane equals the integral of f over this region. The deviations of these stochastic variables with respect to their expected values E(x) and E(y), that is: x-E(x) and y-E(y), are mutually correlated as can be derived from the diagram in FIG. 1. An increase of the value x-E(x) statistically leads towards an increase of the value y-E(y) in this example. A quantity representative of this dependence or correlation is the covariance of x and y: cov(x,y), defined as the value of the product (x-E(x))(y-E(y)) averaged over the probability density. The expressions cov(x,x) and cov(y,y) give the so-called variances or standard-deviations of x and y, respectively, that are measures for the expected values for the quadratic deviation from the respective mean values E(x) and E(y), respectively. The smaller the variance, the more pronounced the probability density in the neighbourhood of the mean value.

When the ordered pair (x,y) is looked upon as a vector v, represented on the base with unit vector $e_x$ and unit vector $e_y$, the covariance matrix is defined as E((v-E(v))(v)-E(v)), having on-diagonal components cov(x,x) and cov(y,y), and off-diagonal components cov(x,y) and cov(y,x).

Since this covariance matrix is positive symmetric it has an orthonormal set of eigenvectors that defines another base $e_p$ and $e_q$ for therein expressing each vector or matrix that can be expressed on the basis $e_x$ and $e_y$. The covariance matrix takes the form of a diagonal matrix when mapped onto its eigenvector base, that is, it then has off-diagonal components equal to zero.

This diagonal representation of the covariance matrix visualizes the fact that the accordingly transformed representations of vectors v now relate to new stochastic variables p and q, that are linear combinations of the x and y variables and that now are uncorrelated. Moreover, since the covariance matrix is positive definite, the on-diagonal components, being the eigenvalues of the covariance matrix, now represent the respective variances cov(p,p) and cov(q,q) commonly denoted as $o^2_p$ and $o^2_q$, respectively.

As has already been mentioned the transformation for diagonalizing the covariance matrix is known under the names: Principal Components Transforms, Hotelling Transform, Eigenvector Transform or Karhunen-Loève Transform. In signal processing this transformation is used, for instance, for removing dependence-related redundancies in the signal for encoding purposes, or for concentrating the signal-energy into a small number of coefficients, which then can be used advantageously in data compression. Moreover, since the transformation actually is a rotation, it can be used for performing rotations in image processing.

GAUSSIAN FORMULAE

In practice, the often unknown probability function is assumed to be well approximated by a Gaussian function which can be viewed as a first-order term in a series expansion. The Gaussian density is completely defined by the covariance matrix and the mean values of the stochastic variables. Moreover, the Gaussian character of the probability density is not affected by a linear transformation. The general expression for an N-dimensional Gaussian probability density is given by formula (i) in FIG. 2. Therein, N indicates the dimension of the stochastic-vector space, C stands for the appropriate covariance matrix and $C^{-1}$ for its inverse (both C and $C^{-1}$ are symmetric), assuming that the determinant of C, denoted by $|C|$, does not vanish. The vectors $\bar{x}$ and $\bar{\mu}$ represent the stochastic vector and its expected value, respectively.

In equation (i) of FIG. 2, the argument of the exponential function comprises a quadratic function $(\bar{x}-\bar{\mu})\cdot C^{-1}\cdot(\bar{x}-\bar{\mu})$. Mapping the vector $\bar{x}=\bar{\mu}$ onto the base on which $C^{-1}$ (and C as a consequence) takes a diagonal form transforms the argument into a summation of homogeneous quadratic terms. Due to the properties of the exponential function, the joint probability density now can be separated into factors, each representing a one-dimensional Gaussian probability density of the form given in formula (ii) in FIG. 2, and each with an appropriate variance $o^2_i$ and mean value $\mu_i$.

Geometrically, the Principal Component Transform represents a rotation of a surface, on which the quadratic function $(\bar{x}-\bar{\mu})\cdot C^{-1}\cdot(\bar{x}-\bar{\mu})$ takes a constant value, into an orientation, wherein its axes of symmetry, coincide with the (new) coordinate axes. This also holds good with respect to the Gaussian density function, since it is a function of the above quadratic expression itself.

GEOMETRIC CONSTRUCTION

The invention now proposes a method of determining approximations of the eigenvectors and eigenvalues of the covariance matrix, in an order of decreasing statistical significance. This will be explained with reference to FIG. 3. The contours in the diagram of FIG. 3 again indicate the surfaces on which both the quadratic expression related to the covariance matrix and hence the Gaussian probability density assume constant values. The origin of the coordinate axes x and y has been translated to the mean value location E(x) and E(y) with respect to FIG. 1. The constuction by vector addition as will be explained hereinbelow is therefore to be performed while taking the mean value location as the origin. The object is now to find approximations of the directions of the axes of symmetry, indicated by p and q, as related to the coordinate system x and y, of the quadratic function, and hence, of the Gaussian density function. This will be accomplished as follows.

As a first estimate $\bar{c}_1$ for an eigenvector an initial vector $\bar{\Theta}_1$ is chosen on the basis of some criterion or at random. A second estimate $\bar{c}_2$ is built by first choosing a second vector $\bar{\Theta}_2$ and by thereupon combining linearly the first estimate $\bar{c}_1$ and the second vector $\bar{\Theta}_2$, the latter being weighted by a factor equal to the sign-function operating on the inner product $(\bar{c}_1\cdot\bar{\Theta}_2)$. In the given example, this implies adding the vector minus to the first estimate $\bar{c}_1$ for producing $\bar{c}_2$. A third estimate $\bar{c}_3$ and a fourth estimate $\bar{c}_4$ are constructed similarly upon choosing a third vector $\bar{\Theta}_3$ and a fourth vector $\bar{\Theta}_4$, respectively. The formulae that summarize the above construction are presented in FIG. 4.

It can be deduced from the diagram in FIG. 3, that each next estimate $\bar{c}_{k+1}$ tends to produce a smaller angle with the p-axis, that is the axis having a direction parallel to the eigenvector associated with the largest eigenvalue. This eigenvector is referred to as the statistically most significant eigenvector. (It should be noticed that the ratio between the respective eigenvalues corresponds to the ratio between the lengths of the respective principal axes of the drawn contours.) Thus, by enhancing each next estimate $\overline{c_{k+1}}$ into the direction of its predecessor $\overline{c_k}$ by way of the weighting factor that incorporates the sign-function operating on said inner product, each next estimate $\overline{c_{k+1}}$ is developed further into the direction of the principal axis. Upon termination of this iterative process, the last obtained estimate is taken as an approximation for the most significant eigenvector. Although the above does not present a rigorous mathematical proof it lends support to the idea.

For approximating the other eigenvectors, the vectors $\Theta_k$ taken into account therefor, should lie in the subspace orthogonal to the already obtained approximations, that is, the orthogonal complement. Therefore, a chosen vector $\Theta_k$ chosen is stripped of its components that lie in the other subspace spanned by the already obtained approximations.

According to another version of the proposed method, vectors $\Theta_k$ for use in the iteration process preferably should have absolute inner product values with already obtained and normalized approximations that are smaller than a predetermined upper bound. The orthogonalization therefore is postponed until the last estimate is obtained. Thus, the stripping of the above-mentioned components is avoided during each iteration step but the last one. For each vector $\Theta_k$ there should be performed an inner product calculation in order to decide whether it should be taken into account or not. In addition, these inner product results are preferably used for calculating the variance associated with each approximation, thus utilizing efficiently already determined results for another purpose, which will be explained with reference to FIG. 8.

In this way, the above strategy produces the approximations of the eigenvectors successively, namely in the order of decreasing statistical significance.

The approximation of the eigenvalue belonging to a particular eigenvector is determined according to the well known rules of statistics. That is, the sample variance $s^2$ as an approximation of the variance $\sigma^2$ associated with a particular eigenvector with respect to the mean value origin is given by the formula of FIG. 5, $\overline{\Theta_k}$ each time indicating the k-th vector used for determining that particular eigenvector as has been set forth hereinabove and in the formulae of FIG. 4.

INNER PRODUCT FACTORS

Instead of using the (binary) sign function (FIG. 6(a)) for by operating on the inner product inp producing the weight factor wf, the (ternary) modified sign function of FIG. 6(b) preferably is used for taking into account only those vectors that give rise to a substantial improvement of the current estimate, thus reducing the number of operations. In other words, only those vectors are considered relevant for the current approximation, that result in the inner product having an absolute value greater than a predetermined lower bound B. During the current process for determining the approximation of a particular eigenvector, some vectors $\Theta$ are discarded on account of their inner products in this process being too small and therefore on account of a slow development when used. These discarded vectors $\Theta$, however, lie in a region of the vector space that would deliver vectors $\Theta$ giving rise to substantial inner product values when used in the process for developping the approximations of the further eigenvectors.

FIRST EXEMPLARY APPARATUS

FIG. 7 represents a diagram of a first example of an apparatus (70) for processing signal data for successively determining estimates for a particular principal component or eigenvector.

The apparatus 70 comprises a vector generator 72 for successively producing vectors $\Theta_k$. For k=1, the produced vector $\Theta_1$ is routed via routing device 74 towards memory 76 for being stored therein as a first estimate for the most significant eigenvector approximation. Each next produced vector $\Theta_{k+1}$ is routed via the routing device 74 towards register 78 for being stored therein. The vector stored in register 78 and the preceding estimate $\overline{c_k}$ stored in memory 76 are fed into inner product means 80 for calculation of the inner product value. The calculated inner product value is operated upon by function means 82, for example through the sign function according to FIG. 6a or the modified sign function according to FIG. 6b. The output of function means 82 delivers the factor for weighting the current vector $\Theta_{k+1}$ stored in register 78. To this end, multiplying means 84 receives both the factor and the current vector $\Theta_{k+1}$ for producing the weighted vector that is to be added in adder 86 to the preceding estimate $c_k$ stored in memory 76. The adding result $\overline{c_{k+1}}$ is thereupon stored in memory 72 to replace the former estimate $\overline{c_k}$. Preferably, the inner product operations in inner product means 80, the multiplications in multiplying means 84 and the summing operations in adder 86 each are performed in parallel with respect to the relevant vector components. Preferably, the memory 76 is of a type allowing for parallel writing and parallel reading the vector components.

It should be noticed in case function means 82 performs the sign function operation, either the vector $\Theta_{k+1}$ is simply to be inverted in multiplying means 84, or it is to be fed directly into adder 86. In this case the multiplying means is a single inverter inverting the contents of register 78. The vectors $\Theta$ produced for each iterative process in order to calculate the approximation of a particular eigenvector should be orthogonal to the already determined approximation.

SECOND EXEMPLARY APPARATUS

Figure 8:
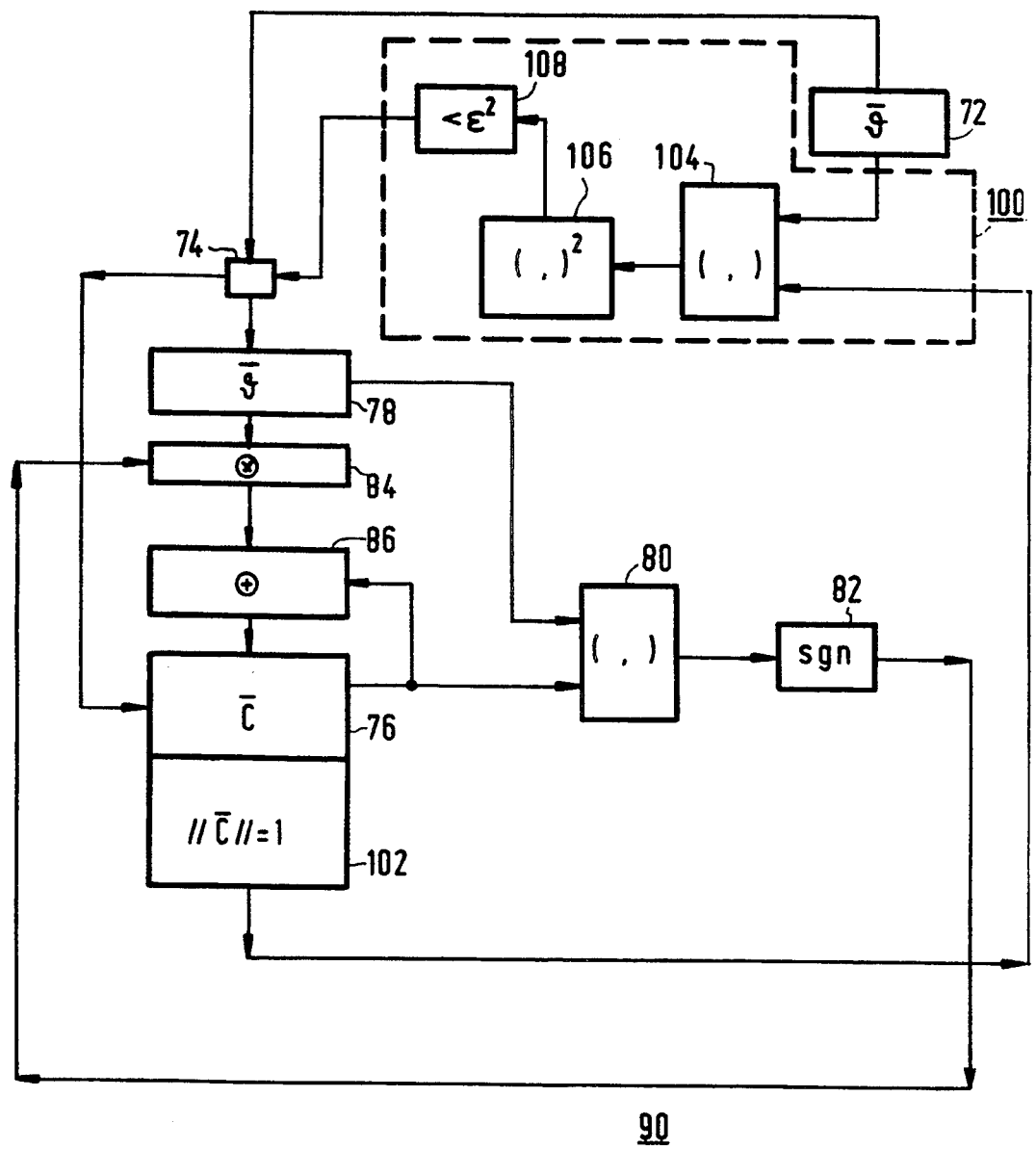
FIG. 8 shows a second example of an embodiment of an apparatus according to the invention.

In FIG. 8 a second diagrammatic example of an apparatus according to the invention is shown. Like reference numerals indicate parts identical to or corresponding with those of the apparatus of FIG. 7. The shown apparatus 90 has been extended with respect to the apparatus 70 according to FIG. 7 by addition of a decision means 100 for deciding whether a current vector $\Theta_{k+1}$ produced by vector generator 72 should play a part in the vector construction according to FIG. 3 that leads towards an approximation of the relevant eigenvector. For determining the approximation of the eigenvector of highest rank (most significant eigenvector), decision means 100 is left out of consideration, the apparatus 90 operating similarly to apparatus 70 of the previous FIG. 7. Upon having determined the last obtained estimate of the first eigenvector, it is normalized onto unity and stored as a first base vector in base memory 102. For determining each next approximation the apparatus 90 operates as follows. A first vector $\Theta_1$ produced is examined in decision means 100 for determining whether it leads towards inner product values with the previously determined base vectors small enough for taking it into account for the vector construction.

In case the inner product values are small enough, the vector $\overline{\Theta}_1$ fed directly into memory 76 via routing device 74. In case vector $\overline{\Theta}_1$ does not stand the test, it is discarded for the vector construction and a next vector is produced. Each next produced vector $\overline{\Theta}_{k+1}$ that has stood the test is loaded into register 78 from whereon the process proceeds as has been explained with reference to FIG. 7. Upon having obtained the last estimate for the current eigenvector, it is orthogonalized with respect to the base vectors stored in memory 102 and normalized onto unity for storing into base memory 102.

In case the set of vectors $\overline{\Theta}$ produced by vector generator 72 differs for each iterative process leading towards the associated approximation, the variance according to the formula in FIG. 5 is calculated by re-introducing the particular set into inner product means 104 together with the just determined associated base vector. The input of squaring device 106 is coupled with the output of inner product means 104 for squaring each inner product value. Thereupon these squared values are summed and divided by the number of vectors $\overline{\Theta}_k$ produced during the iterative process, both those taken into account for the vector construction and those left out of consideration due to their too small inner product values.

In case the same set of vectors is used for each iterative process, several operations related to the inner product value test and the calculation of the variance may be interwoven as follows.

The inner product value test is conducted by inner product means 104, squaring device 106 and comparator 108. The squared inner product values are stored in an ancillary memory (not shown) for use in the variance calculations. During each iterative process only the new inner product values are to be calculated, that is, only the inner product values with respect to the last obtained base vector are to be determined. These results, together with the values stored in the ancillary memory (not shown) establish the criteria for deciding whether or not the current vector $\overline{\Theta}$ may pass to the vector construction stage. However, these new inner product values are exactly the ones required for calculation of the variance associated with the previously (last) obtained base vector. Therefore, the variance associated with base vector $\overline{c}_k$ is determined in the vector construction stage for base vector $\overline{c}_{k+1}$. Only upon terminating the quest for the next base vector, the last one obtained has to be re-introduced into the inner product means 104 for producing the associated variance.

SINGULAR VALUE DECOMPOSITION

The Singular Value Decomposition (SVD) of an mxn data matrix according to the inventive method that incorporates the PCA already dealt with hereinabove will now be explained. It should be borne in mind that within the field of signal processing numerous applications utilize SVD as has already been stated hereinabove.

The relationship to start with is formula (i) in FIG. 9, $\overline{x}$ being an input vector in the n-dimensional input space and giving rise to an output vector $\overline{y}$ in the m-dimensional output space that is related to $\overline{x}$ by a linear transformation substantiated by matrix A. Because the matrix A is unknown in general, measurements are conducted in order to produce exemplary pairs $(\overline{x}_\mu, \overline{y}_\mu)$ of input vectors $x_{82}$ associated with pertaining output vectors $y_{82}$. It is assumed that the exemplary input vectors $x_\mu$ are randomly and uniformly distributed in such a region of the input space, that the input vector components of different ranks are uncorrelated, while the pertaining variances equal unity. This characterization is expressed by formula (ii) of FIG. 9. Herein, the input covariance matrix $<\overline{XX}>$ takes the form of a unity diagonal matrix. Consequently, the output covariance matrix $<\overline{yy}>$ takes the form presented in formula (iii) of FIG. 9. That is, $<\overline{yy}>$ equals a symmetric matrix $AA^T$ composed of the matrix product of matrix A and its transposed version $A^T$.

The symmetric matrix is diagonalized using a transformation matrix $V_1$, the columns thereof constituting a representation of the eigenvectors $\overline{v}$ of the symmetric matrix (formula (iv)). Here, the eigenvectors $\overline{v}$ of matrix $AA^T$ lie in the output space. The matrix $AA^T$ is of rank r, that is, it has a number of r eigenvalues larger than zero. The same holds good for the symmetric matrix $A^TA$ to be diagonalized in the input space, on the understanding that the diagonal form now is obtained via an nxr transformation matrix $U_1$, that consists of the eigenvectors $\overline{u}$ of $A_TA$ in the input space (formula (v)). It can be deduced that the matrix A can be written as the right-hand side expression in formula (vi) in FIG. 9. The matrix $\Sigma_1$ comprises the so-called singular values associated with the eigenvalues incorporated in $\Sigma_1^2$. The expression of formula (vi) is commonly referred to as the Singular Value Decomposition.

Thus, on the basis of the measurements an output covariance matrix is constructed that is symmetric and that contains information about the assumed linearity of the system under consideration. According to the method already discussed hereinabove with reference to FIG. 3, the eigenvectors of this symmetric matrix are approximated successively, normalized versions thereof constituting the columns of the transformation matrix $V_1$. However, as can be visualized by formula (vii) in FIG. 9, in each iterative step for generating a next estimate for a particular eigenvector $\overline{v}$ in the output space, the associated input vector has to be transformed accordingly in order to produce eventually a pertaining eigenvector $\overline{u}$ in the input space. It should be noticed that, due to the uniform character of the distribution of the exemplary input vectors, the input covariance matrix is already on diagonal form (formula (ii) in FIG. 9). As a consequence any additional base in the input space would keep the input covariance matrix in its unity diagonal form. However formula (vii) of FIG. 9 represents the constraint for selecting the input space base.

The above construction for the successive estimates of a particular output eigenvector $\overline{v}$ and the pertaining input eigenvector $u$ is formulated in FIG. 10, the notation $\overline{c}_k$ being reserved for the k-th estimate for output eigenvector $\overline{v}$, the notation $\overline{b}_k$ being reserved for the pertaining k-th estimate of the associated input eigenvector $u$. For all exemplary input-output pairs the relation of formula (i) is valid, reflecting the linear relationship between input vector $\overline{x}_k$ and associated output vector $\overline{u}_k$. As a first estimate $\overline{c}_1$ for $v$ a particular output vector $\overline{y}_k$ is chosen, and as a first estimate for $u$ the associated input vector $\overline{x}_1$ is chosen. The derivation of each next estimate $\overline{c}_{k+1}$ is stated in formula (iii) of FIG. 10, and is similar to the derivation as has been explained with reference to FIG. 4. In order to maintain the relation of formula (iv) in FIG. 10, that is, the linear relationship between the corresponding estimates as justified by formula (vii) of FIG. 9, the next estimate $\overline{b}_{k+1}$ is to be determined according to formula (v) in FIG. 10. The sign function operating on the inner product can also be replaced by the modified sign function as explained with reference to FIG. 6. Upon termination of the iterative process, each estimate $\overline{c}_{k+1}$ and $\overline{b}_{k=1}$ is normalized onto unity for representing the respective unit length base vectors. The singular values themselves are determined as will be explained with reference to the formulae of FIG. 11. In formula (i) of FIG. 11 the linear relationship between input vector $\overline{x}$ and output vector $\overline{y}$ is written down in index notation, each index occurring twice in a particular term representing a summation over this index. Formula (ii) represents in this way the index notation version of formula (vi) in FIG. 9, $\hat{v}_{il}$ and $\hat{u}_{jl}$ being the respective components of the matrices $V_1$ and $U_1$, respectively. Substituting expression (ii) of FIG. 11 into formula (i) of FIG. 11 delivers the expression (iii), the right hand side now comprising an inner product involving the vector $\overline{x}$ and the unit length input base vector $\overline{u}_l$ of rank 1. Upon multiplying both sides with the unit length output base vector $\overline{v}_l$, the pertaining singular value $\sigma_l$ is determined by the quotient of the inner products $(\overline{y}\cdot\overline{v}_l)$ and $(\overline{x}\cdot\overline{u}_l)$. Averaging over all exemplary pairs ultimately delivers the approximation for the eigenvalue $\sigma_l$, as indicated in formula (iv) in FIG. 11.

THIRD EXEMPLARY APPARATUS

Figure 12:
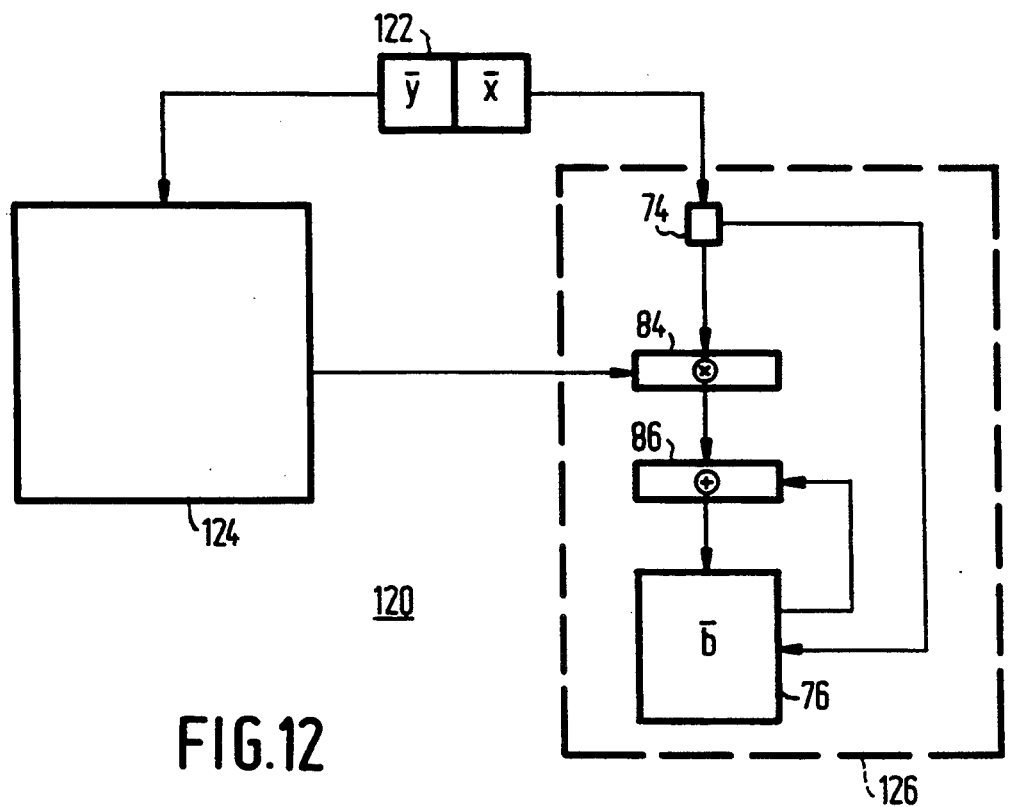
FIG. 12 outlines a third exemplary apparatus according to the invention.

In fact the output base vectors in the SVD are calculated in the same way as the eigenvectors in the PCA. Therefore, the apparatus as proposed for implementing the PCA is incorporated in an apparatus for implementing the SVD. Further calculation means for calculating the input base vectors accordingly and the singular values are to be added then. This has been represented in the apparatus according to FIG. 12. The shown exemplary apparatus 120 performs the above explained SVD. To this end it includes a vector generator 122 for producing output vectors y and input vectors x, each output vector y being linearly related to a respective input vector x. The respective output vectors y are fed into the output base calculator 124, which for instance includes an apparatus as is shown in FIG. 7 or FIG. 8 and has been reviewed previously. Output base calculator 124 calculates the respective output base vectors, that is, the columns of matrix $V_1$ in formula (vi) of FIG. 9. The input vectors x are fed into input calculator 126 for calculating the input base vectors, that is, the columns of matrix $U_1$ in formula (vi) of FIG. 9.

The respective parts of input calculator 126 have been indicated by the same numerals as are used in FIGS. 7 and 8 and they perform the same tasks as has been described accordingly. Thus, for calculating a particular input base vector a first estimate $x_1$ is loaded via routing device 74 into memory 76. For each next estimate a next input vector $x_{k+1}$ is input into multiplying means 84 via routing device 74 for being multiplied by the relevant factor received from output base calculator 124. The multiplying result is thereupon loaded into adder 86 for being added to the preceding estimate stored in memory 76. Upon termination of this iterative process as regards the particular input vector, the last obtained estimate is normalized onto unity for being used as the respective base vector.

FOURTH EXEMPLARY APPARATUS

It should be noticed that in an apparatus according to the invention the following parts may be present singularly for being used both in the calculation of the output estimate and in the calculation of the input estimate: the routing device 74; the multiplying means 84; the adder 86. This has been outlined in FIG. 13.

Figure 13:
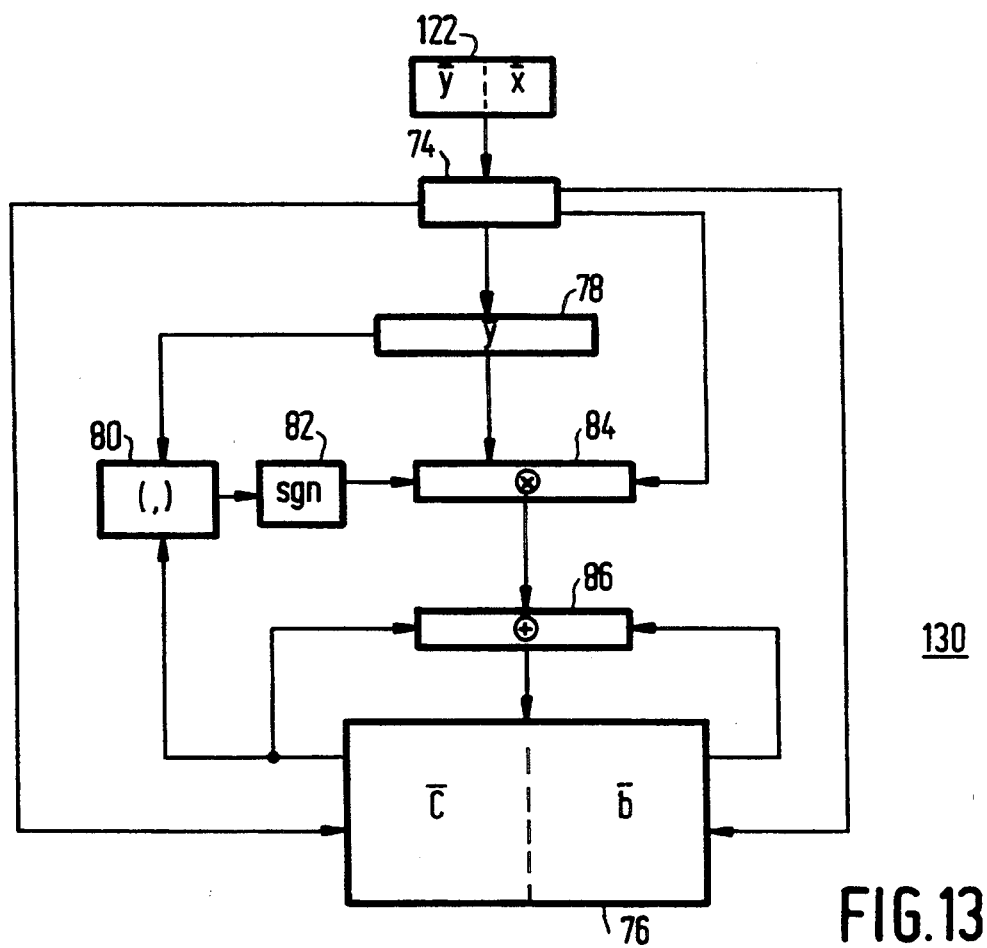
FIG. 13 outlines a fourth exemplary apparatus according to the invention.

FIG. 13 represents a fourth exemplary apparatus 130 according to the invention. The reference numerals refer to like pans as have been indicated in the FIGS. 7, 8 and 12. The vector generator 122, which may comprise for instance the combination of parts 72 and 100 of FIG. 8, feeds vectors into routing device 74, that now sends the respective output vectors y either directly to memory 76 or to register 78 as explained with reference to FIGS. 7 and 8, and sends the respective input vectors x either directly to memory 76 or to multiplying means 84, as explained with reference to FIG. 12.

I claim:

1. Apparatus for processing electrical signal data representing an image in a digital data processing device according to a Principal Component Transform for purposes of providing a revised representation of the image-representing electrical data signals for use in compressing the electrical data signals, or for extracting features of the electrical data signals, or for modifying the electrical data signals to pre present a rotation of the image, the apparatus comprising:

hardware input means for providing signals representing an initial vector as a current estimate of a statistically most significant eigenvector of a covariance matrix representation of said signal data, said signal data being represented as vectors in a vector space;

hardware means for storing and providing signals representing a next vector;

an inner product hardware means for calculating an inner product of the current estimate and the next vector;

hardware multiplication means for multiplying said next vector by a weight determined by said inner product;

hardware adding means for adding the next vector multiplied by said weight to the current estimate for enhancing an adding result in a direction of the current estimate; and an output hardware memory for storing and providing the adding result as signals representing a produced approximation of an eigenvector, which is a transformation of the signal data, for further processing as a revised representation of the image-representing electrical data signals.

2. Apparatus as claimed in claim 1, wherein the input means comprises a vector generator for generating signals representing normalized vectors orthogonal to the produced approximations of the eigenvectors.

3. Apparatus as claimed in claim 2 further comprising a decision means for selectively introducing signals representing vectors into the output memory or into the means for storing on the basis of the vectors' associated inner product values with the produced approximations of the eigenvectors.

4. Apparatus for processing electrical signal data representing an image on the basis of a Singular Value Decomposition for purposes of providing a revised representation of the image-representing electrical signal data for use in compressing the electrical signal data, or for extracting features of the electrical signal data, or for modifying the electrical signal data to represent a rotation of the image, the signal data being represented by output vectors, each being associated with a respective input vector, characterized in that the apparatus includes:
- a first hardware memory for storing an initial output vector as a current output estimate;
- a hardware register for storing a next output vector;
- an inner product hardware means for calculating an inner product of the current output estimate and of said next output vector;
- a first multiplication hardware means for multiplying said next vector by a weight determined by the inner product;
- a first adding hardware means for adding the next output vector multiplied by said weight to the current output estimate and for storing this adding result in said first memory as the current output estimate;
- a second hardware memory for storing an initial input vector associated with the initial output vector as a current input estimate;
- a second multiplication hardware means for multiplying a next input vector associated with said next output vector by said weight; and
- a second adding hardware means for adding the next input vector multiplied by said weight to the current input estimate and for storing this adding result in said second memory as the current input estimate.

5. Apparatus for processing electrical signal data on the basis of a Singular Value Decomposition for purposes of providing a revised representation of the image-representing electrical signal data for use in compressing the electrical signal data, or for extracting features of the electrical signal data, or for modifying the electrical signal data to represent a rotation of the image, the signal data being represented by output vectors each being associated with a respective input vector, characterized in that the apparatus includes:
- a hardware memory for storing a current input estimate and a current output estimate;
- a hardware register for storing an output vector;
- an inner product hardware means having a vector input connected to the register and a further input coupled to the memory for calculating an inner product involving the next output vector and the current output estimate;
- a hardware multiplying means coupled to an output of the inner product means and having a vector input coupled to said register;
- a hardware routing device for receiving respective output vectors and respective input vectors and for routing a respective output vector either directly to said memory or to the register and for routing a respective input vector either directly to said memory or to the vector input of the multiplying means; and
- a hardware adder having a first input coupled with said multiplying means and a second input with the memory and having an output coupled with the memory.

6. Apparatus as claimed in claim 1, 4 or 5, characterized in that at least one of the following devices perform their relevant operations in parallel with respect to vector components:
- the memory for writing in parallel relevant estimate components therein;
- the register for writing in parallel next vector components;
- the inner product means for executing in parallel component multiplications;
- the multiplication means for multiplying in parallel next vector components by said weight;
- the adding means for adding in parallel weighted next vector components to current estimate components of mutually equal rank.

7. Apparatus as claimed in claim 1, 14, or 5, characterized in that a function means is coupled between and output of the inner product means and a weight input of said multiplication means for applying one of the following functions on an inner product result:
- a sign function;
- a sign function in case an absolute value of the inner product result is larger than a predetermined lower bound, and a zero function otherwise.

8. The apparatus of claim 1 wherein the means for storing is a register.

9. The apparatus of claim 1 wherein the multiplication means is a multiplier.

10. The apparatus of claim 1 wherein the means for adding is an adder.

* * * * *